C. W. WATSON.
TOOL HOLDER.
APPLICATION FILED FEB. 7, 1916.
1,244,665.                                    Patented Oct. 30, 1917.
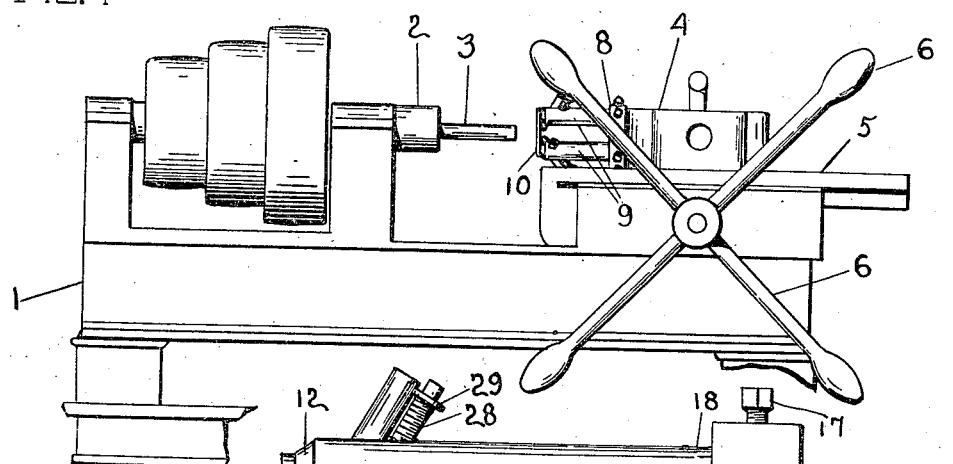
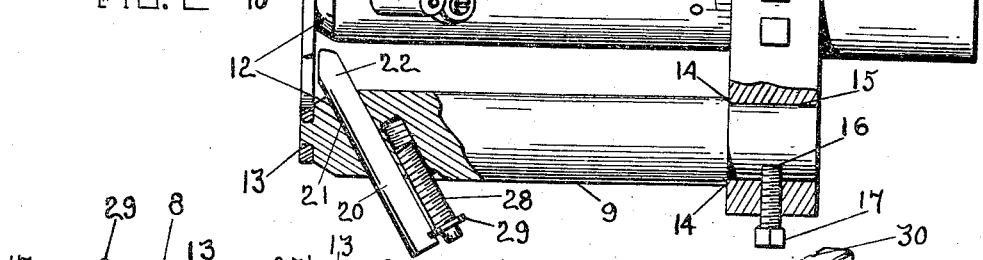
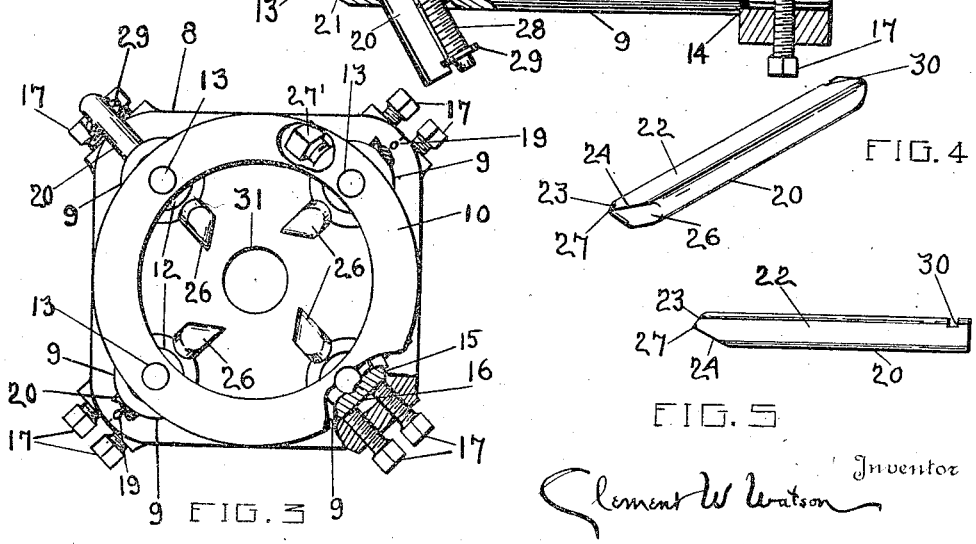

UNITED STATES PATENT OFFICE.

CLEMENT W. WATSON, OF TOLEDO, OHIO.

TOOL-HOLDER.

1,244,665.  Specification of Letters Patent.  Patented Oct. 30, 1917.

Application filed February 7, 1916. Serial No. 76,556.

*To all whom it may concern:*

Be it known that I, CLEMENT W. WATSON, a citizen of the United States of America, residing at Toledo, Lucas county, Ohio, have invented new and useful Tool-Holders, of which the following is a specification.

This invention relates to holders and tools.

This invention has utility when incorporated in cutting tools and holders, especially for rough turning of material.

Referring to the drawings:

Figure 1 is a fragmentary side elevation of an embodiment of the invention as mounted in the turret of a turning lathe;

Fig. 2 is a side elevation with parts broken away of the holder and tools therein;

Fig. 3 is an end elevation with parts broken away of the holder and tools of Fig. 2;

Fig. 4 is a perspective view of one of the tools; and

Fig. 5 is a side elevation of one of the tools.

The machine tool 1 may be provided with a rotary holder 2 for the work 3. Opposing this work may be the turret 4 movable toward and from the work 3 with the traveling member 5 as actuated by the hand wheel 6. In the turret 4 is fixedly mounted the stem 7 carrying the base 8 having rising therefrom the arms or posts 9 extending to the opposing holding member 10 parallel and opposing the base holding member 8. The base member 8 may be anchored to the stem 7 by the set screw 11. The ends of the posts 9 remote from the base member 8 have the reduced ends 12, riveted into snug fitting engagement with the openings 13 of the outer stiffening or holding ring member 10.

The arms or posts 9 have the shoulder 14 engaging the base member 8 for determining positively the axial position of the posts 9 in opposing the work 3 in normal operation. The reduced diameter portion 15 of each arm 9 extending in the base member 8 forming a shoulder 14 has the chord slot 16 with which a pair of set screws 17 coact. Each arm 9 carries a scale 18, the graduations of which are disposed adjacent the graduations 19 of the base member 8. Accordingly, by setting back one set screw 17 and running up the other, each arm or post 9 may be rocked on its axis and simultaneously locked into such rocked position, not only against further or any rocking movement, but against axial movement.

Each post 9 may carry such number of tools as may be desired. As herein shown each post 9 is carrying one cutting tool 20 disposed in an opening 21 directly through the axis of the arm 9 but inclined to axially extend as to the working direction of the skeleton head.

The tool 20 has the flat side 22 determining at all times the cutting edges 23, 24. The face 25 determines the cylindrical cut on the stock by the edge 23, and the face 26 determines the progress cut radially of the stock by the edge 24. A templet or scale may be used to determine the angle 27 between the faces 25 and 26 in grinding of these faces, the line of which edge 27 may recede from the intersection of the edges 23, 24. By confining the grinding to the faces 25, 26, the flat face 22 determines the cutting edges 23, 24, as always constant and effectively eliminates any errors or troubles in tool upkeep. Further, these cutting edges 23, 24, may be positively fixed as to the arm 9 by set screw 27'. The fitting of the tool 20 into the work as well as withdrawal therefrom is positively controlled by the screw 28 having the collar 29 engaging in the recess 30 of the tool 20. Accordingly, the screw 28 is a positive longitudinal feed-determining device for the tool 20, while the set screw 27' is an additional positive lock holding the tool against rocking.

It is to be noted the face 22 of the tool 20, as held by the set screw 27', is not in a plane parallel to the axis of the arm 9, but is inclined to such axis, thereby insuring the rake or advantageous angle of cut for the edges 23, 24, in working operations.

Adjustment of the tools 20 axially of the arms 9 permits considerable range in the diameter of cuts to be made in the stock. Further, this longitudinal adjustment of the tool permits of the use of a minimum of expensive high speed steel stock in a tool, which stock may be used throughout a considerable portion of its lineal extent.

In the handling of various stocks for the speed of operation, the turning and the proper entering action and clearing of the tool as to the stock varies. To most advantageously care for these variations, it is essential to adjust the position of the tool as to its line of direction axially of the work. For instance, in the tougher materials as hard steel it is desirable to have the cutting edges 23, 24, in advance of the radius in the relative rotation of the stock as to the tool. The adjustment to care for this condition is readily accomplished by manipulation of the set screw 17. For softer stock, these adjustments may be readily varied in this same skeleton cutter head. In the instance of brass, the rocking of the arms 9 should be such as to bring the cutting edge, as 23, 24, back of the radius of relative rotation of the work extending through the axis of the arm 9.

In the operations with this cutter head, the skeleton or open structure precludes any clogging, even of heavy cuts of stock, for these turnings readily pass between the posts or arms 9.

The opposing plurality of tools 20 take up the transverse pushing action of the tools relatively to each other for effectively holding the tools in the work for balanced and uniform cutting action. Flooding of the cut material effectively is easily possible, to dissipate the heat from the rapid operation, while the distribution of the cutting to the plurality of tools permits of rapid work without objectionable heating of the cutters. In progressive cutting of stock of considerable length, the proportions may be such that the opening 31 in the stem 7 can care for the cut material to be guided therethrough.

For the setting of the tools 20 an article of the desired finished diameter may be centered in the member 10 even at the bench and the tools 20 fed up to have the cutting edges 23 in proper position. With the head in the machine tool all but one of the cutters 20 may be run back into inoperative position by the screw 28, and the one left in position adjusted to effect cutting until the desired diameter of cut is attained upon the stock, then the remaining cutters may be run up into position as to this diameter of cut and so locked by the set screws 27'.

This cutter head is of simple rigid construction of a type to handle a great range in variety and sizes of stock in most rapid and economical manner embodying features of simplicity in adjustment and upkeep to readily care for the wide range of operative conditions.

In the device as herein disclosed all the progressive cutting power is effective for cutting the stock. The work during the process is visible at all times so the operator may see the character of cut made. The rigid type of construction and balanced action of the cuts reduce vibrations to a minimum and thus eliminate chatter. The tools 20 are interchangeable and are the only wearing parts in this device.

What is claimed and it is desired to secure by Letters Patent is:

1. A holder embodying a base, an annular series of parallel arms extending from the base, tools carried by the arms, an arm holding ring parallel to the base for stiffening the arms, and means for independently rocking the arms to vary the tool adjustment.

2. A plurality of cutting tools for work, a skeleton head supporting said tools in opposing relation, and means for independently angularly adjusting the tools as to the work.

3. A plurality of cutting tools, independently rockable adjustable carrying arms for the tools, and supporting means for the arms.

4. A plurality of cutting tools, adjustable carrying arms for the tools, and a base for the arms, said arms rockably adjustable as to said base.

5. A plurality of cutting tools, arms for the tools, and a pair of opposing holding members for the arms as to one of which the arms are independently adjustable.

6. A plurality of cutting tools, arms for the tools, a holding member for the arms, and means for adjusting the arms relatively to the member.

7. A plurality of tools, arms for the tools, a holding member for the arms, and adjustable locking means carried by the member for the arms whereby the arms may be locked in adjusted position as to the member to maintain the position of the tools.

8. A turning tool, a holder inclining the tool along the axis of the work, and a skeleton support axially of the work for the holder, said support embodying a member rockable to adjust the tool.

9. A turning tool, a holder inclining the tool along the axis of the work, a skeleton support axially of the work for the holder, and adjusting means for the tool, said support embodying a member rockable for additionally rocking the tool.

10. A turning tool, a holder inclining the tool along the axis of the work, a skeleton support axially of the work for the holder, and means for adjusting the tool in the holder, said support embodying a member rockable for additionally rocking the tool.

11. A turning tool, a holder inclining the tool along the axis of the work, a skeleton support axially of the work for the holder, and means for longitudinally adjusting the tool in the holder, said support embodying a member rockable for additionally rocking the tool.

12. A work holder, a turning tool, a holder inclining the tool along the axis of the work, a support axially of the work for the holder, and means for laterally adjusting the tool with the holder as to the support.

13. A work holder, a turning tool, a holder inclining the tool along the axis of the work, a support axially of the work for the holder, and means for rocking the holder as to the support.

14. A work holder, a cutting tool having a flat side, a holder inclining the tool along the axis of the work, said holder extending longitudinally of the axis of the work, and said tool having a grinding face intercepting the flat side to permit the flat side to determine a pair of cutting edges for the tool.

15. A work holder, a turning tool for work, a holder for the tool extending longitudinally of the axis of the work, means for adjusting the tool angularly as to the work, and means for locking the adjusted tool in position.

16. A work holder, a cutting tool, a holder for axially inclining the tool, there being a mounting for said holder axially of its work, and means for moving the holder as to the mounting in adjusting the direction of the cutting edge of the tool as to the relative axis of the work.

17. A work holder, a tool, a holder for the tool, there being a mounting for the tool axially of the work, and means including a support for rocking the holder and tool as to the support to adjust the cutting edge of the tool as to the relative radius of the work.

18. The combination with a support, parallel arms extending from said support, and an annular series of tools carried by the arms to bring advance operating edges of said tools respectively into material removing position as to the work.

In witness whereof I affix my signature.

CLEMENT W. WATSON.

Copies of this patent may be obtained for five cents each, by addressing the "Commissioner of Patents, Washington, D. C."

It is hereby certified that in Letters Patent No. 1,244,665, granted October 30, 1917, upon the application of Clement W. Watson, of Toledo, Ohio, for an improvement in "Tool-Holders," an error appears in the printed specification requiring correction as follows: Page 2, lines 116 and 122, claims 10 and 11, for the words "a skeleton" read *an open frame;* and that the said Letters Patent should be read with this correction therein that the same may conform to the record of the case in the Patent Office.

Signed and sealed this 20th day of November, A. D., 1917.

[SEAL.]

R. F. WHITEHEAD,
*Acting Commissioner of Patents.*

Cl. 29—105.